United States Patent
Lattard et al.

(10) Patent No.: US 6,347,112 B1
(45) Date of Patent: Feb. 12, 2002

(54) CIRCUIT FOR DIRECT SEQUENCE SPREAD SPECTRUM DIGITAL TRANSMISSIONS WITH GENERATION OF AN INTERFERENCE SIGNAL

(75) Inventors: Didier Lattard, Rencurel; Jean-René Lequepeys, Fontaine; Didier Varreau, St. George de Commier; Bernard Piaget, Venon, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/166,544

(22) Filed: Oct. 5, 1998

(30) Foreign Application Priority Data

Oct. 22, 1997 (FR) .............................................. 97 13238

(51) Int. Cl.[7] .......................... H04B 15/00; H04K 1/00; H04L 27/30
(52) U.S. Cl. ...................... 375/146; 375/130; 375/140; 375/135
(58) Field of Search ................................ 375/146, 140, 375/130, 135, 244; 370/335, 336, 342, 343, 441, 442

(56) References Cited

U.S. PATENT DOCUMENTS

| | | | | |
|---|---|---|---|---|
| 5,398,258 A | * | 3/1995 | Su et al. | 375/200 |
| 5,553,062 A | | 9/1996 | Schilling et al. | 370/18 |
| 6,115,411 A | * | 9/2000 | Van Driest | 375/200 |

FOREIGN PATENT DOCUMENTS

| | | |
|---|---|---|
| EP | 0 491 668 | 6/1992 |
| EP | 0 778 677 | 6/1997 |

* cited by examiner

*Primary Examiner*—Mohammad H. Ghayour
(74) *Attorney, Agent, or Firm*—Oblon, Spivak, McClelland, Maier & Neustadt, P.C.

(57) ABSTRACT

A circuit able to operate either as a direct sequence spread spectrum differential signal emitter, or as a generator of interference signals corresponding to multiple access noise. The circuit employs a clock signal formation and data processing module, a differential coding module, a multiplexing module, and a direct sequence spread module when operating as a spread spectrum emitter, and has an additional amplification-inversion module for use when generating an interference signal.

2 Claims, 6 Drawing Sheets

CIRCUIT FOR DIRECT SEQUENCE SPREAD SPECTRUM DIGITAL TRANSMISSIONS WITH GENERATION OF AN INTERFERENCE SIGNAL

DESCRIPTION

1. Technical Field

The present invention relates to a circuit for direct sequence spread spectrum digital transmissions with generation of an interference signal corresponding to a multiple access noise.

2. Prior Art

The direct sequence spread spectrum modulation technique has been used for many years, particularly in radio-communications with satellites and in the military sector.

In a digital data emitter using a conventional modulation technique, the data to be emitted modulate a radio-frequency carrier. The modulation used can be a phase, frequency, amplitude or mixed modulation.

In order to simplify the description, reference will only be made to phase modulations, which are now the most frequently used.

The digital data to be transmitted consist of binary elements or bits, which have a period $T_b$, i.e. a new bit must be transmitted every $T_b$. With said bits it is possible to form bit groups, also known as symbols, whose period is T and is a multiple of $T_b$. These symbols will modulate the radio-frequency carrier, e.g. in phase.

This technique can be illustrated by two phase modulation examples:

a) The modulation known as binary phase shift keying or BPSK, which consists of allocating a phase state, e.g. 0, to the 0 bits, and a phase state $\pi$ to the 1 bits. In this case the symbol is the actual bit ($T_s=T_b$) and the radio-frequency carrier phase state is imposed on every bit.

b) Modulation known as quaternary phase shift keying or QPSK, which consists of using symbols formed by two successive bits, so that said symbols can assume four states (00, 01, 10, 11). A state of the phase of the carrier is allocated to each of these states, in this case $T_s=2T_b$ and the radio-frequency carrier phase state is imposed on every other bit.

On the reception side, it is necessary to demodulate the signal received. A distinction can be made between two major demodulation families, namely coherent demodulation and non-coherent demodulation. The coherent demodulation technique consists of implementing, in the receiver, a subassembly, whose function is to estimate the mean phase of the carrier, so as to reconstitute a phase reference, which is then mixed with the signal received in order to demodulate the data.

The non-coherent demodulation technique is based on the observation, according to which it is sufficient for the phase reference of the symbol to be compared with the phase of the preceding symbol. In this case, instead of estimating the phase of the symbols, the receiver estimates the phase difference between two successive symbols. This is a differential phase shift keying or DPSK or a differential quadrature phase shift keying or DQPSK.

The attached FIGS. 1 to 3 diagrammatically show the structure and operation of a spread spectrum emitter and receiver operating in DPSK. This corresponds to FR-A-2 712 129.

FIG. 1 shows the block diagram of an emitter. Said emitter has an input Ee, which receives the data $b_k$ to be emitted and comprises a differential coder 10, constituted by a logic circuit 12 and a delay circuit 14. The emitter also comprises a pseudorandom sequence generator 30, a multiplier 32, a local oscillator 16 and a modulator 18 connected to an output Se, which supplies the DPSK signal. The logic circuit 12 receives the binary data $b_k$ and delivers the binary data d The logic circuit 12 also receives the data delayed by one order or rank, i.e. $d_{k-}$. The logic operation performed in the circuit 12 is the exclusive-OR on the data $b_k$ and on the delayed compliment of d (i.e. on $$\overline{d_{k-1}}$$

$$d_k = b_k \oplus \overline{d_{k-1}}$$

The pseudorandom sequence used on emission for modulating the data must have an autocorrelation function with a marked peak (of value N) for a zero delay and the smallest possible secondary lobes. This can be obtained by using maximum length sequences, also called m-sequences, or so-called GOLD or KASAMI sequences in exemplified manner. This pseudorandom sequence designated $\{c_i\}$, has a bit rate N times higher than the rate of the binary data to be transmitted. The duration $T_c$ of a bit of said pseudorandom sequence and which is also known as a chip is consequently equal to $T_b/N$.

The chip rate of the pseudorandom sequence can be several million, or several tens of millions per second.

The attached FIG. 2 is the block diagram of a corresponding receiver of the differential demodulator type. This receiver has an input Er and comprises a matched filter 20, whose pulse response is the time reverse of the pseudorandom sequence used in the emitter, a delay circuit 22 with a duration $T_b$, a multiplier 24, an integrator 26 on a period $T_b$ and a logic decision circuit 28. The receiver has an output Sr, which restores the data.

If $x(t)$ is used for designating the signal applied to the input Er, the multiplier 24 receives the filtered signal $x_F(t)$ and the delayed-filtered signal $x_F(t-T_b)$. The product is integrated on a period equal to or smaller than $T_b$ in the integrator 26, which supplies a signal, whose polarity makes it possible to determine the value of the transmitted bit.

The input filter 20 used in the receiver has a base band equivalent pulse response H(t) and said response must be the time-reverse, conjugate complex of the pseudorandom sequence c(t) used on emission:

$$H(t)=c^*(T_b-t)$$

The signal supplied by such a filter is consequently:

$$x_F(t)=x(t)*H_F(t)$$

where the symbol * designates the convolution operation, i.e.

$$x_F(t) = \int_0^{T_b} x(s) \cdot c^*(s-t)ds.$$

Thus, the matched filter 20 performs the correlation between the signal applied at its input and the pseudorandom spread sequence.

In a gaussian additive noise channel, the signal x(Ft) will consequently be in the form of a pulse signal, the pulse repetition frequency being $1/T_b$. The envelope of this signal is the autocorrelation function of the signal c(t). The information is carried by the phase difference between two successive correlation peaks. Thus, the multiplier output is formed by a succession of positive or negative peaks, as a function of the value of the transmitted bit.

In the case of a radiotransmission in the presence of multiple paths, the output of the matched filter is formed by a succession of correlation peaks, each peak corresponding to a propagation path.

The different signals of the reception chain are represented in FIG. 3. Line (a) represents the filtered signal $x_F(t)$, line (b) the correlation signal $x_F(t)*x_F(t-T_b)$ and line (c) the signal at the integrator output.

The direct sequence spread spectrum modulation technique has been extensively described in the specialist literature and reference can e.g. be made to the following works: "CDMA Principles of Spread Spectrum Communication", by Andrew J. VITERBI, Addison-Wesley Wireless Communications Series, "Spread Spectrum Communications", by Marvin K. SIMON et al., vol. I, 1983, Computer Science Press, "Spread Spectrum Systems", by R. C. DIXON, John WILEY and Sons.

This technique is also described in certain articles: "Direct-sequence Spread Spectrum with DPSK Modulation and Diversity for Indoor Wireless Communications", published by Mohsen KAVEHRAD and Bhaskar RAMAMURTHI in the journal "IEEE Transactions on Communications", vol. COM 35, No. Feb. 2, 1987, "Practical Surface Acoustic Wave Devices", by Melvin G. HOLLAND, in the journal Proceedings of the IEEE, vol. 62, No. May 5, 1974, pp 582–611.

The direct sequence spread spectrum technique has numerous advantages, such as:

Discretion: this discretion is linked with the spread of the transmitted information over a wide frequency band, leading to a low spectral density of the emitted power.

Multiple access: several direct sequence spread spectrum links can share the same frequency band using orthogonal spread pseudorandom sequences (sequences having an intercorrelation function having very low residual noise for all shifts), said technique being known as code distribution multiple access or CDMA.

A good cohabitation with conventional narrow band communications: the same frequency band being shared by systems using a narrow band modulation and those using a broad band modulation. There is only a slight increase in ambient radio noise to narrow band communications and this decreases with the increase in the sequence length. Spread spectrum modulation communications bring about a rejection of narrow band modulations due to the correlation operation performed on reception.

The interception difficulty: a direct sequence spread spectrum transmission is difficult to intercept as a result of the low spectral density and the fact that the receiver must know the spread sequence in order to be able to demodulate the data.

An excellent behaviour in a multi-path environment, where the propagation of the radio wave takes place in accordance with multiple paths using reflection, diffraction and scattering phenomena. Moreover, not infrequently there is no longer a time-stable, direct path between the emitter and the receiver. This multiple path propagation induces parasitic effects, which tend to deteriorate the transmission quality.

Code distribution multiple access (CDMA) transmission systems encounter a difficulty resulting from the interference occurring between a transmission channel using a spread code individual to a particular user and the other channels using other codes individual to other users. If the sequences used were rigorously orthogonal, these interferences would not exist but, in practice, this is not the case.

On designating by $g_i(t)$ and $g_k(t)$ two pseudorandom sequences allocated to users i and k, it is possible to define a coefficient $\mu_{i,k}$ expressing the correlation between these two sequences. This coefficient is equal to the mean, on the duration Ts of one symbol, of the product of the sequences, namely:

$$\mu_{i,k} = \frac{1}{Ts}\int_o^{Ts} g_i(t) \cdot g_k(t) dt.$$

This coefficient represents an autocorrelation if i=k and a intercorrelation if i≠k.

The signal at the output of the correlator corresponding to the user of rank k (i.e. the output of the multiplier 24 of FIG. 2) can be written, as a function of this coupling coefficient:

$$A_k d_k + \sum_i \mu_{i,k} A_i d_i + \frac{1}{Ts}\int_o^{Ts} n(t) \cdot g_k(t) \cdot dt$$

where $A_k$ is the amplitude of the signal individual to the user of rank k, $g_k(t)$ the pseudorandom sequence individual to said user, $d_i$ the transmitted data item and n(t) an additive, gaussian, white noise. In this expression, i ranges between 0 and K, K being the total number of users, but without taking the value k individual to the considered user.

The first term, i.e. $A_k d_k$, makes it possible to find the data item $d_k$, the second corresponding to a correlation with the signals corresponding to the other users. This term is called multiple access interference or MAI. If the sequences are chosen and constructed so as to have limited intercorrelations, the coefficients $u_{i,k}$ are close to zero and the interference effect on the signal of the user k with the other users i remains small.

The existence of this multiple access interference leads to a non-negligible consequence on the capacity of the transmission system, i.e. on the number of simultaneously acceptable users and on the performance characteristics of the system. Moreover, the presence of users emitting a strong signal will increase the effect of multiple access interference on users emitting a weak signal. Users emitting a weak signal could be completely jammed by users emitting stronger signals. For example, in multi-point to point communications, this phenomenon arises when the emitters, emitting with identical amplitudes, are at different distances from the receiver. The signal of the closest emitter will arrive at the receiver with a higher amplitude than the signal emanating from a more remote emitter, taking account of attenuation differences. This effect is known as the near/far effect.

Numerous research has been carried out with a view to reducing this interference phenomenon, namely:

Research on pseudorandom spread sequences: This approach aims at finding a set of sequences having good orthogonality properties. In the ideal case where $\mu_{i,k}$=0 (for i differing from k), the codes are strictly orthogonal and the term corresponding to the multiple access interference is zero. However, as in practice CDMA communications systems are asynchronous, it is mathematically impossible to guarantee this orthogonality for variable time shifts between each system user. In practice, codes are consequently sought having the smallest intercorrelation coefficients between them.

Research on the control of power levels: A strict control of the emission power of the different users of the system aims at ensuring that the power levels received at the receiver are identical for all codes of the CDMA system. This control limits the near/far effect, but as a result of the attenuation phenomenon and fast variations of the radio channel, there are limits to this power control.

The use of adaptive antennas: The idea is to point the antenna in the direction of the sought user, the multiple access interference effect then being reduced.

Research on higher performance receiver structures based on a joint data multi-user detection. The only hypothesis made is that the codes of the system are known to the receiver, but unfortunately this theoretical structure is very complex to implement.

Over the last few years research has been directed at solutions which, although not being of an optimum nature, still provide a definite improvement to performance characteristics compared with those of a conventional detector. Among these solutions, reference can be made to interference cancellation receivers. A distinction can be made between two receiver types, depending on whether they involve a parallel or a successive interference cancellation. These two types of known receivers will be briefly described.

A) A successive interference cancellation receiver comprises:
- a base band signal receiver,
- a first stage on a conventional detector,
- a circuit for selecting the user producing the highest correlation value, (user received with the highest power),
- a decoding of the informations linked with said user for restoring the emitted symbol,
- a regeneration of the base band signal emitted by said user by the spread of the restored symbol with the aid of the spread sequence used,
- a cancellation of the thus regenerated signal in the initial base band signal,
- a reiteration of this process (with the new base band signal obtained) up to the decoding of the lowest power signal.

Such a technique is e.g. described in the article by P. PATEL et al. entitled "Analysis of a Simple Successive Interference Cancellation Scheme in a DS/CDMA System" published in IEEE Journal on Selected Areas in Communications, vol. 12, No. Jun. 5, 1994, pp 796–807. The corresponding receiver is illustrated in the attached FIG. 4. It comprises a base band reception circuit 30, an array of correlators 41, 42, . . . , 4$k$, the same number of integrators 51, 52, . . . , 5$k$, a circuit 60 for the selection of the maximum of the signals $Z_1$, $Z_2$, . . . $Z_k$ obtained after integration, i.e. $Z_i$, the corresponding data item di being obtained by the sign of $Z_i$, a base band signal regeneration circuit 62 using the pseudorandom sequence of the user i for respreading the data item di, an inverter 66 reinjecting the thus obtained base band signal into the reception circuit, in order to subtract therefrom the part linked with the user i.

Following this initial processing, the circuit determines a new maximum and performs a new correction and so on.

This interference cancellation procedure is suitable for cases where the relative power levels of the different users have very differing values. Thus, in this case, it is the user which has received with the highest power which is the easiest to decode and it is consequently this user which causes the greatest interference to the other users.

However, three major technical problems still have to be solved in order to be able to implement this technique, namely:
- select the highest power user,
- regenerate the interference signal of said user (amplitude, data, taking account of various propagation paths),
- programming dynamically the circuits in order to be able to carry out successive correlations with pseudorandom sequences of users which have not yet been encoded.

Thus, this process remains highly theoretical and the circuit of FIG. 4 does not appear to have passed beyond the laboratory simulation stage.

B) With regards to parallel interference cancellation receivers, they use:
- a first stage based on a conventional detector (correlator array),
- a generation of an interference signal by each of the system users,
- for each of the users, the cancellation in the signal received of all the interferences produced by the other system users,
- a second correlator and final data estimation stage.

Such a technique is described in the article by R. M. BUEHRER et al. entitled "Analysis of DS-CDMA Parallel Interference Cancellation with Phase and Timing Errors", published in IEEE Journal on Selected Areas in Communications", vol. 14, No. Oct. 8, 1996, pp 1522–1535. The corresponding receiver is illustrated in the attached FIG. 5 in the case of three users. The reception signal r(t) is processed in a first stage constituted by three correlators 101, 102, 103 using the three pseudorandom codes of the users. These correlators supply three decision signals $Z_1^1$, $Z_2^1$, $Z_3^1$, which are processed in three estimation circuits 111, 112, 113. The latter supplies signals $\hat{s}_1^1$, $\hat{s}_1^1$, $\hat{s}_1^1$, which are obtained by the spread of the signal Z by pseudorandom sequences of the three users and by weighting as a function of the respective powers detected. For each user, the signals ŝ of the other users are summated, i.e. respectively $$\sum_{2,3}$$

for the user 1, $$\sum_{1,3}$$

for user 2 and $$\sum_{1,2}$$

for user 3. These sums are subtracted from the reception signal r(t) in a second stage constituted by three subtractors 121, 122, 123, in order to obtain three new signals $r_1$, $r_2$, $r_3$, which will in turn be correlated with the pseudorandom sequences of the users, respectively in three correlators 131, 132, 133. Thus, in said second stage are obtained three new decision signals $Z_1^2$, $Z_2^2$, $Z_3^2$, to which are made to correspond three signals spread by the corresponding pseudorandom sequences, i.e. $\hat{s}_1^2$, $\hat{s}_2^2$, $\hat{s}_3^2$, and so on.

This parallel interference cancellation procedure, unlike the preceding procedure, is appropriate for cases where the relative power levels of the different users have substantially identical values.

However, two major technical problems still have to be solved:
- the regeneration of the interference signal (amplitude and data, taking account of the different propagation paths),
- subtracting the estimated interferences (control of the delay, storage of the base band signal received, etc.).

Here again, the means proposed in the literature are theoretical rather than practical.

The object of the present invention is to obviate these disadvantages by proposing a circuit which completely meets the practical requirements.

DESCRIPTION OF THE INVENTION

The idea on which the invention is based is to form a generator of an interference signal corresponding to the multiple access noise on the basis of means generally used in direct sequence spread spectrum emitters. Thus, for producing such an interference signal corresponding to the multiple access noise, it is necessary to start with data reconstituted by the receiver and which must be respread by a particular sequence, which is precisely the operation which is performed in a conventional emitter. However, it is also necessary to have a weighting means, in order to multiply the respread data (i.e. in practice the chip train) by the amplitude of the signal received and individual to the user in question and to invert said signal so that it can then be subtracted from the signal from which the interference is to be removed. It is therefore necessary to supplement the ordinary emitter by amplification and inversion means.

Conversely, the symbol generation and differential coding operations performed in a conventional emitter are not need in an interference correction receiver, so that the means corresponding thereto in the emitter must be neutralized.

Thus, a double function circuit is obtained, i.e. able to operate as a conventional emitter, or as a generator of interference signals corresponding to the multiple access noise, with also the certainty that the implementation of such means will give rise to no practical problems, because it is essentially a technique which has already been proved in emitters.

More specifically, the present invention relates to a circuit for direct sequence spread spectrum digital transmissions with the generation of interference signals corresponding to multiple access noise, characterized in that it comprises:
  a) a first module able to receive on one input data and organize them into symbols and produce on an output a clock signal linked with said symbols,
  b) a second module for the differential coding of the symbols supplied by the first module,
  c) a third multiplexing module incorporating a first group of inputs connected to the differential coding module and a second group of inputs able to receive two data items defining the polarity of the interference generation signal, said multiplexing module transmitting one or other of the signals present on one or other of said input groups,
  d) a fourth spreading module able to multiply the signal which it receives from the multiplexing module by a pseudorandom sequence,
  e) a fifth amplification-inversion module having a signal input connected to the spreading module and having two control inputs able to receive two signals for regulating the amplification gain, the outputs of said fifth module supplying either two amplified and inverted signals when the fifth module is active, or the signal applied to its input when it is rendered transparent, said circuit being able to operate either as a direct sequence spread spectrum differential signal emitter when the first, second and fourth modules are rendered active, the multiplexing module then transmitting data coming from the second differential coding module, the fifth module also being rendered transparent, or as a generator of interference signals corresponding to the multiple access noise when the multiplexing module transmits the data applied to its second group of inputs and when the fourth and fifth modules are rendered active, the first and second modules being rendered inactive.

DETAILED DESCRIPTION OF EMBODIMENTS

Figure 1:
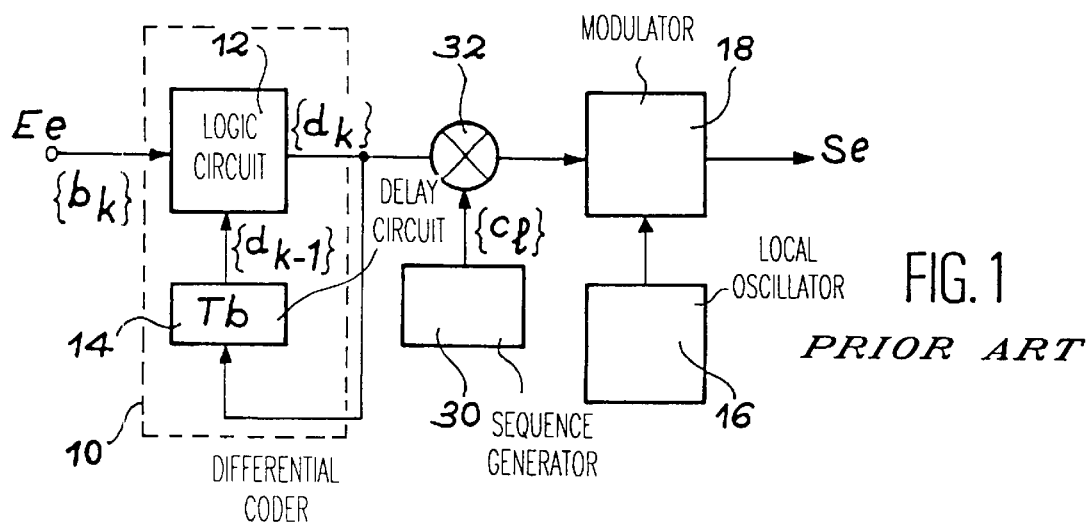
FIG. 1, already described, is a block diagram of a known spread spectrum emitter.
Figure 6:
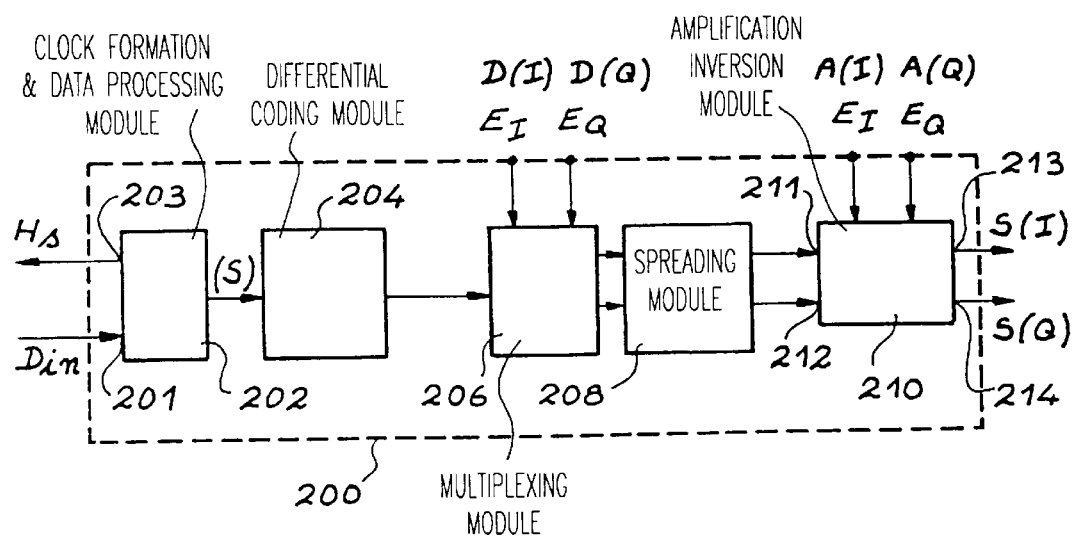
FIG. 6 shows the general structure of a circuit according to the invention.
Figure 5:
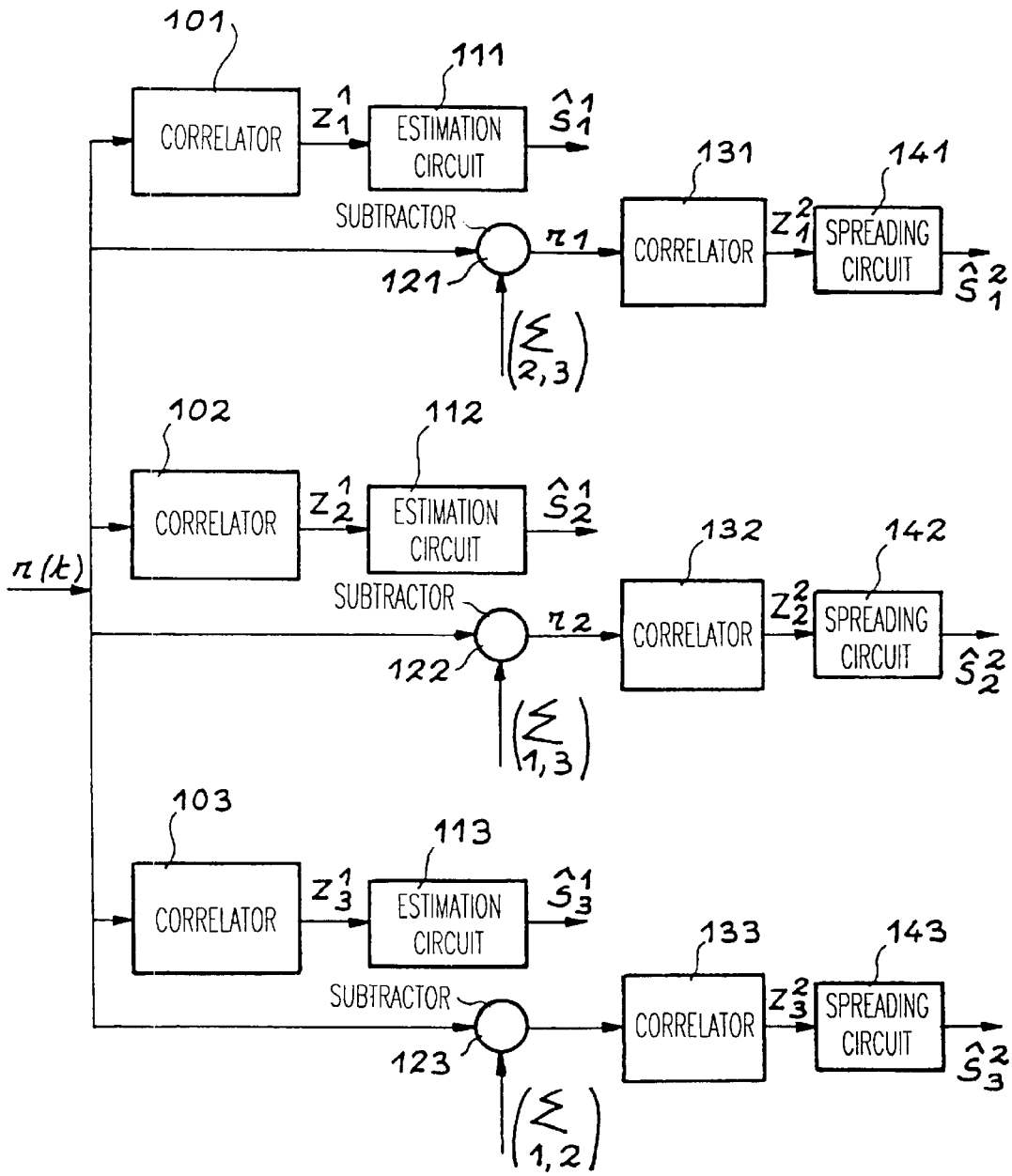
FIG. 5, already described, illustrates a known procedure for parallel corrections of multiple access interferences.

FIG. 6 is a block diagram of the circuit according to the invention. The circuit 200 comprises:
  a) a first block or module 202 able to receive on an input 201 data D and organize them in to symbols (S) and produce on an output 203 a clock signal (Hs) linked with said symbols,
  b) a second block or module 204 for the differential coding of the symbols (S) supplied by the first module 202, said second module being similar to the module 10 in FIG. 1,
  c) a third multiplexing block or module 206 having a first group of two inputs ($E_I$, $E_Q$) able to receive two data items ($D_I$, $D_Q$) defing an interference correction signal and a second input $E_D$ connected to the output of the differential coding module 204,
  d) a fourth spreading block or module 208 able to multiply the signal which it receives from the multiplexing module 206 by a pseudo-random sequence, so that as in FIG. 1, said block has a pseudo-random sequence generator and a multiplier,
  e) a fifth amplification-inversion block or module 210 having two control inputs ($E_I$, $E_Q$) able to receive two amplification gain control signals ($A_I$, $A_Q$), two signal inputs 211, 212 connected to the spreading module 208 and two signal outputs 213, 214 supplying two signals (S(I), S(Q)).

Figure 8:
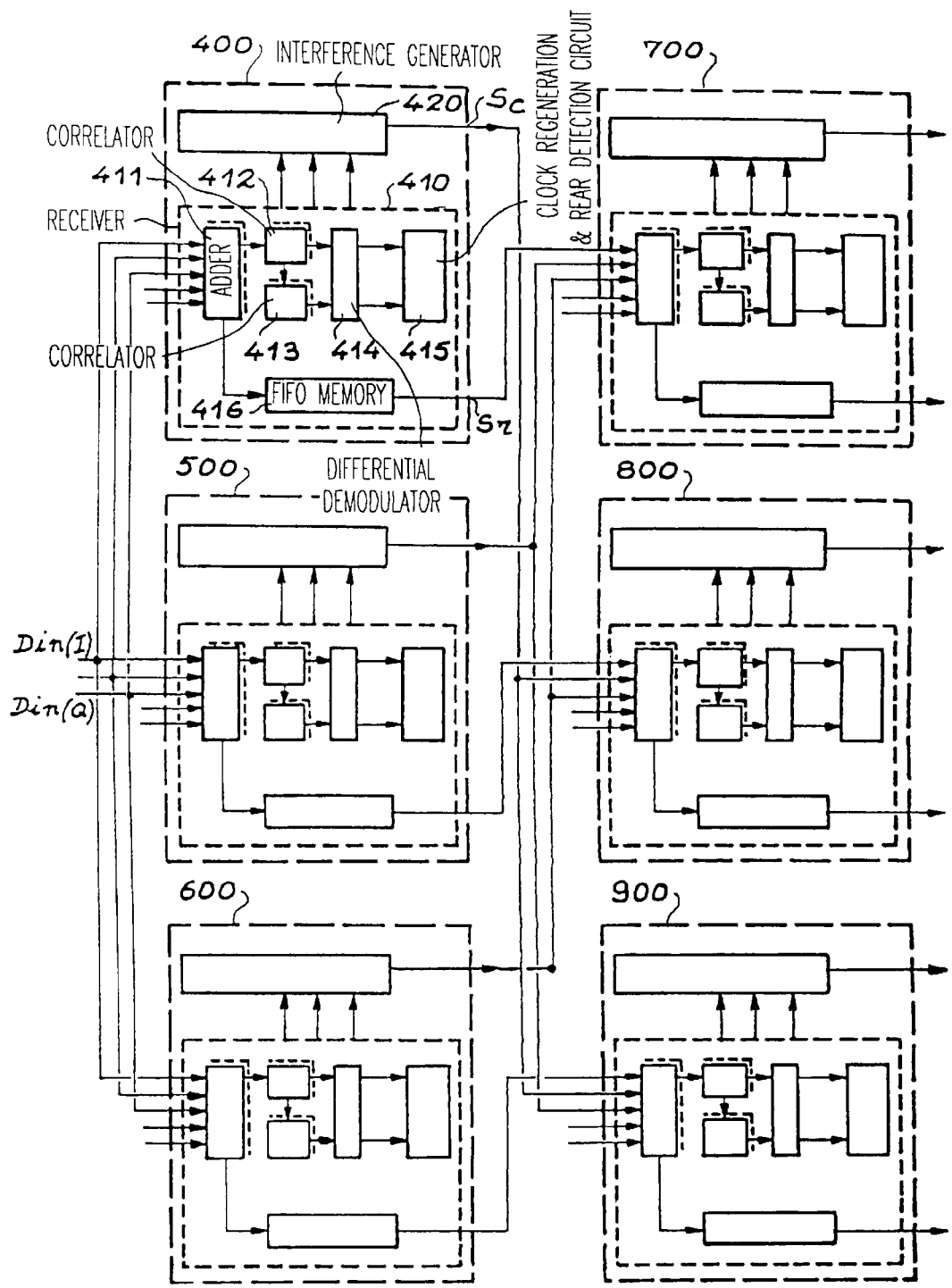
FIG. 8 illustrates a receiver circuit with parallel interference correction, said circuit using several components like that of FIG. 7.

Such a circuit is able to have two separate configurations and consequently two functions: i. when the module s 202 and 204 are rendered active, the multiplexing module 206 being controlled so that its output is connected to its second input, i.e. that receiving the symbols coming from the module 204 and the amplification module 210 is made transparent, then the assembly 202-204-208 constitutes a conventional spread spectrum emitter, ii. conversely, when the modules 202 and 204 are rendered inactive, the multiplexing module 206 being controlled so that its outputs are connected to the inputs $E_I$, $E_Q$ and the amplification and inversion module 210 is rendered active, then the assembly 206-208-210 constitutes a generator of interference signals corresponding to the multiple access noise, the signal supplied by such a generator being directly usable in a subsequent correction circuit (as will be shown in FIG. 8).

Before describing certain specific embodiments of the invention, certain information will be given on the nature of the signals processed in spread spectrum receivers.

Consideration is given to a pulsation carrier w, phase modulated by a function of the time P(t). The modulated signal can be written:

$$s(t)=A(t)\cos[wt+P(t)]$$

in which A(t) is the amplitude of the signal.

This expression can be developed to:

$$s(t)=A(t)\cos wt \cos P(t) - A(t) \sin wt \sin P(t)$$

By designating I(t) the part A(t)cos P(t), which is in phase with the carrier and Q(t) the part (A(t)sin P(t), which is in quadrature with the carrier, the latter signal can also be written in the form:

$$s(t)=I(t)\cos wt - Q(t) \sin wt$$

It is then appropriate to consider the complex signal S(t):

$$S(t)=U(t)\exp(jwt)$$

with U(t)=I(t)+jQ(t). The true signal s(t) then corresponds to the real part of the complex signal S(t).

Thus, the signal s(t) can then be carried out by the double processing of the parts I(t) and Q(t), which will subsequently be designated I and Q for reasons of simplification.

The processors processing such signals generally receive on two separate inputs the signals I and Q. These signals are obtained by multiplying the reception signal by a wave which is either in phase with the carrier or in quadrature therewith. The processors then perform various processings as a function of the modulations used. Thus, in the case of a phase differential modulation, there are processing operations consisting of forming the sum or difference of delayed or undelayed sample products, such as e.g. $(I_k I_{k-l} + Q_k Q_{k-l})$ and $(Q_k I_{k-1} - I_k Q_{k-l})$ where k designates the rank or order of a sample.

Literature on this subject calls the first expression Dot and the second Cross. These terms result from the fact that the first signal is of the "internal product" or "scalar product" type between two quantities, conventionally designated by a Dot, whereas the second is of the "external product" or "vector product" type, conventionally designated by a Cross.

Figure 2:
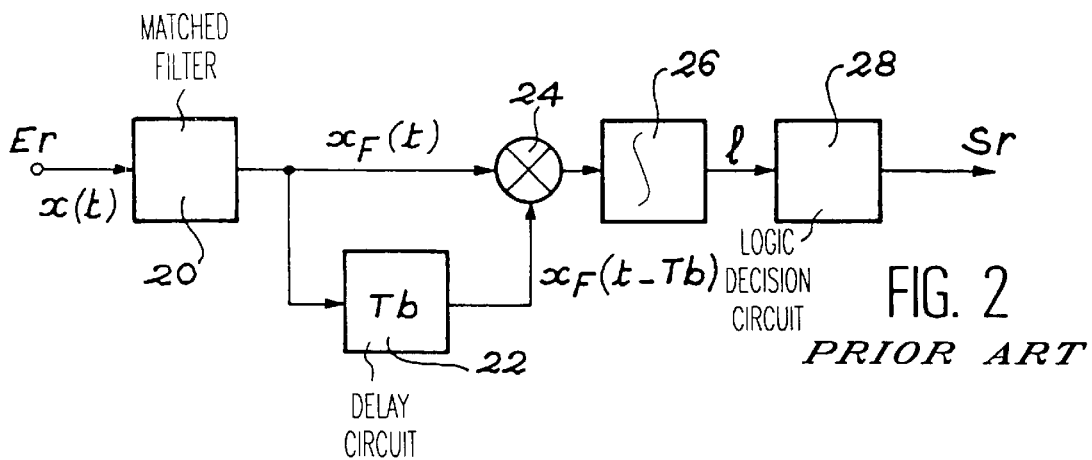
FIG. 2, already described, is a block diagram of a known, spread spectrum receiver.
Figure 3:
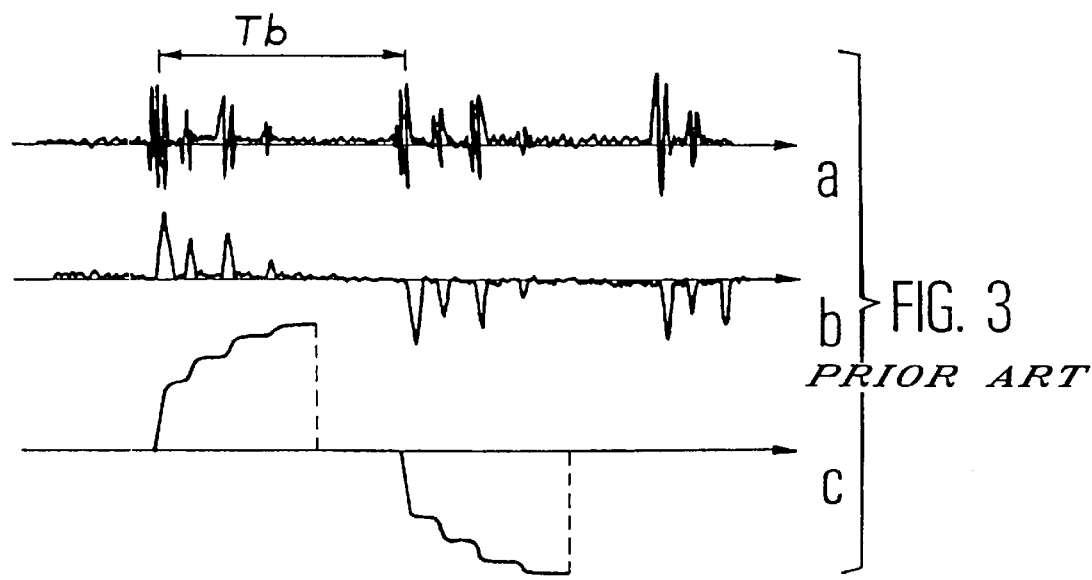
FIG. 3, already described, illustrates the general operation of a receiver like that of FIG. 2.

It is possible to demonstrate that the product of a sample of rank k of signal s(t), i.e. s(k), by a conjugate previous sample, i.e. s*(k−1) and which is calculated in the receiver for demodulating the signal (cf. multiplier 24 in FIG. 2) is, to within the fixed phase rotation, of form:

$$Dot(k)+jCross(k).$$

The Dot signal permits the determination of the phase shift between two successive symbols, whereas the Dot and Cross signals considered together, make it possible to determine the integral number of times π/2 of the phase shift between successive symbols. Thus, said Dot and Cross signals permit the correct, ambiguity-free demodulation when a differential phase modulation has been used on emission.

Figure 4:
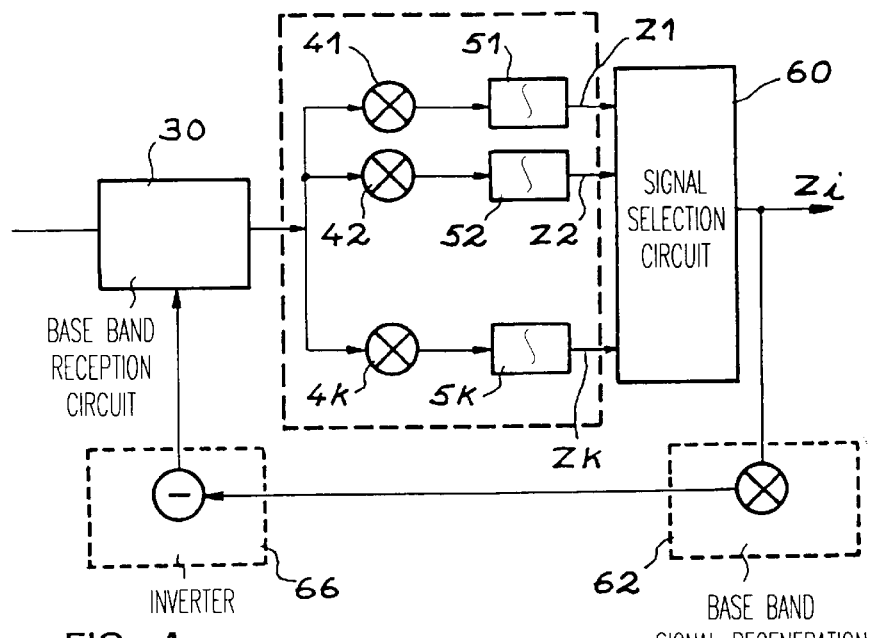
FIG. 4, already described, illustrates a known procedure for successive corrections of multiplex access interferences.

Thus, a spread spectrum signal receiver firstly forms the in phase and in quadrature parts I and Q, followed by matched filtering on each of these signals. On the basis of the samples obtained, the receiver calculates the Dot and Cross signals and, on the basis thereof, restores the information carried by the signal received. FR-A-2 742 014 describes a receiver implementing this technique. On FIG. 4 of the said document is shown a receiver comprising two similar channels, one processing the in phase part I and the other the in quadrature part Q. The first digital processing channel of the in phase part I with the carrier comprises:

i) first digital means 50(I) able to fulfil a first matched filtering function on the pseudorandom sequence used on emission, ii) first digital means 60(I) able to fulfil a first delay function.

The circuit also comprises a second digital processing channel receiving the second part Q of the signal received, said second part being in phase quadrature with the carrier. Like the first, said second channel comprises:

i) second digital means 50(Q) able to fulfil a second matched filtering function at said pseudorandom sequence, ii) second digital means 60(Q) able to fulfil a delay function.

The circuit described in said document also comprises a multiplication circuit 70 having:

two first inputs, one connected to the output of the first digital filtering means 50(I) and receiving a first filtered signal $I_k$ and the other connected to the output of the first means able to fulfil the delay function 60(I) and receiving a first delayed, filtered signal $I_{k-l}$, two second inputs, one connected to the output of the second digital filtering means 50(Q) and receiving a second filtering signal $Q_k$ and the other connected to the output of a second means able to fulfil the delay function 60(Q) and receiving a second delayed, filtered signal $Q_{k-l}$, means for calculating the two direct products between filtered and delayed, filtered signals of the first and second channels, namely $I_k I_{k-l}$ and $Q_k Q_{k-l}$, and the two crossed products between the filtered signal of one channel and the delayed, filtered signal of the other channel, namely $Q_k I_{k-l}$ and $I_k Q_{k-l}$, means for calculating the sum of the direct products, i.e. $I_k I_{k-l} + Q_k Q_{k-l}$ and the difference of the crossed products, i.e. $Q_k I_{k-l} - I_k Q_{k-l}$.

The circuit described in said document also comprises a clock regeneration and integration circuit 80 receiving the sum of the direct products and the difference of the crossed products. This circuit also comprises a digital programming means 90 containing informations suitable for programming the first and second filtering means 50(I), 50(Q).

The two channels also have first and second shaping and summating circuits 95(I), 95(Q), respectively placed in front of the first and second filtering means 50(I), 50(Q).

Figure 7:
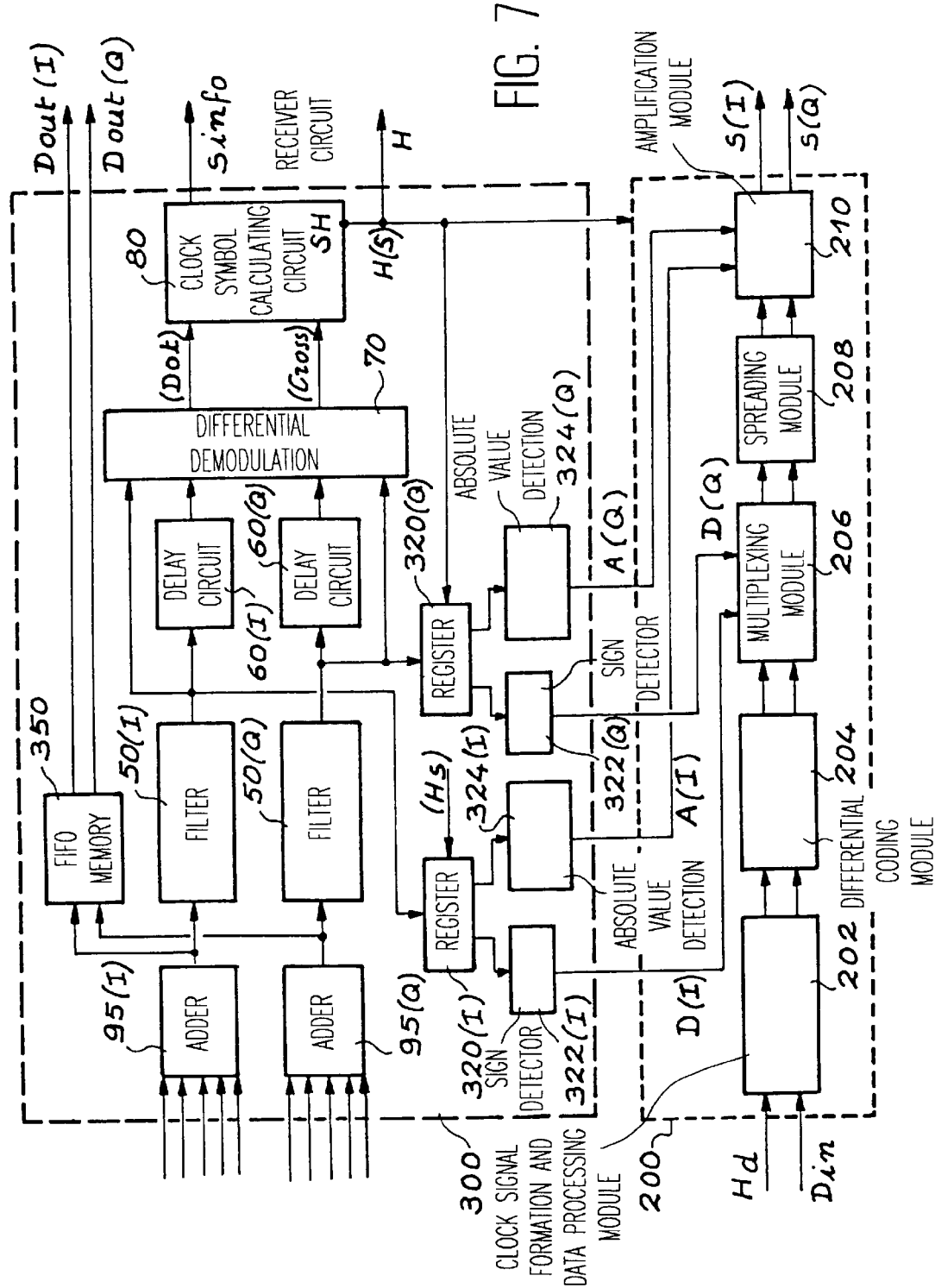
FIG. 7 shows an embodiment of the circuit according to the invention in a receiver component.

The attached FIG. 7 shows such a receiver circuit 300, but in a some what simplified form, also with the circuit according to the invention 200. In the receiver part 300 there are two adders 95I, 95Q, two matched filters 50I and 50Q, two delay circuits 60(I), 60(Q), a differential demodulator 70 and a circuit 80 for calculating the clock symbol Hs.

The receiver also comprises two registers 320I, 320Q, two sign detector circuits 322(I), 322(Q) supplying two data items D(I), D(Q), two absolute value detector circuits 324(I), 324(Q), supplying two signals A(I), A(Q). The circuit shown also incorporates a delay circuit 350, which can in practice be a FIFO (First In-First Out) memory. This memory receives the two base band data items extracted from the adders 302(I), 302(Q) and supply them to the input of a following stage in the form of signals Dout(I), Dout(Q). In practice, the FIFO memory 350 can be split into two FIFO memories, one for the signals of channel I and the other for the signals of channel Q.

Reference can be made to FR-A-2 742 014 for a detailed description of the adders 95(I), 95(Q), matched filters 50(I), 50(Q), delay circuits 60(I), 60(Q), demodulator 70 and clock symbol calculating circuit 80. This document more particularly describes the operation of the circuit 80 permitting, on the basis of Dot and Cross signals, to reconstruct the clock symbol Hs. The essence here is to stress that the receiver 300 supplies reconstituted data D(I), D(Q), as well as the amplitudes A(I), A(Q) of the signals individual to the considered user. These are two information types, which are supplied to the circuit 200 according to the present invention. The data D(I), D(Q) are supplied to the multiplexing module 206, whilst the amplitudes A(I), A(Q) are supplied to the amplification circuit 210 and determine the gain of the latter. The outputs S(I), S(Q) can be connected to the inputs of the adders of a following stage and which also receive the base band signals supplied by the delay means 350 (FIFO), said circuit delaying the initial base band data in order to synchronize them with the interference correction signal.

The circuits of FIG. 7 can be integrated into the same component, which will then contain all the functionalities necessary for implementing a digital transmission by spectrum spread with generation of interferences corresponding to the multiple access noise. It is in fact sufficient to group such components in stages and place the latter in cascade form in order to obtain the desired assembly. Thus, FIG. 8 shows a receiver operating with three users and performing a parallel interference cancellation. This circuit is constructed with six identical components, three constituting a first stage, namely components 400, 500, 600 and the three others, namely 700, 800, 900, constituting a second stage. All the components have the same structure and e.g. comprise in the case of component 400:

i. a receiver 410 constituted by an adder module 411, two correlators 412, 413 both for the channel I (continuous line) and for channel Q (broken line), a single demodulator 414 for both channels I and Q and supplying the Dot and Cross signals, a clock regeneration and peak detection circuit 415 and a FIFO memory 416, ii. an interference signal generator 420 according to FIG. 6.

Component 400 has an interference correction output Sc connected to the inputs of the two components 800 and 900 of the second stage (for the correction), whereas the output Sr of the FIFO memory is connected to the input of the second stage component 700. The same applies with regards to components 500 and 600, whereof the outputs of the generator are connected to the inputs of the components (700, 900) (700, 800) and the delayed outputs to the inputs of components 800 and 900.

Figure 9:
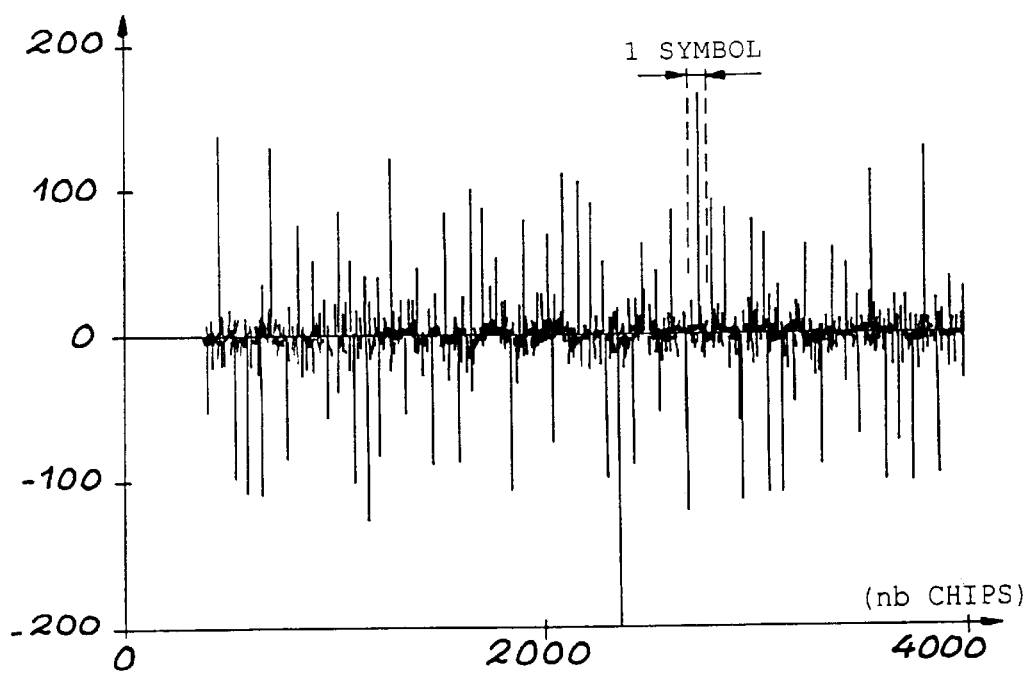
FIG. 9 shows the signal at the output of the first stage of the circuit of FIG. 8.
Figure 10:
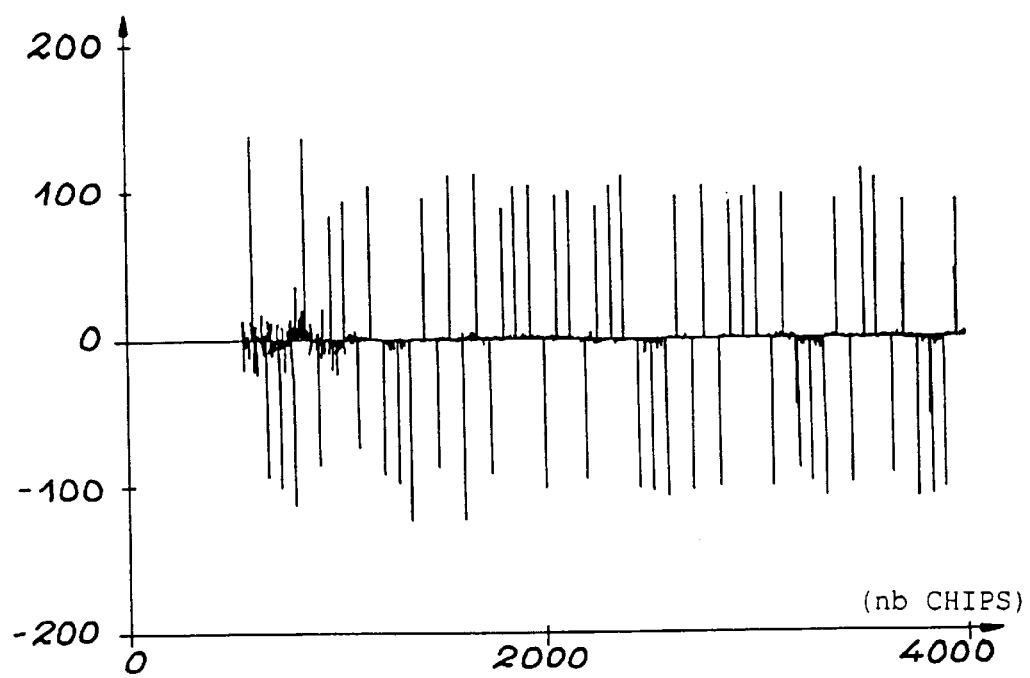
FIG. 10 shows the signal obtained following the multiple access interference correction stage.

FIGS. 9 and 10 illustrate the results obtained with such a circuit. FIG. 9 shows the Dot signal at the output of the first stage (e.g. at the output of circuit 414). In general terms, such a signal consists of a sequence of peaks, which are sometimes positive and sometimes negative, as a function of the transmitted binary information value. The interval between two successive peaks corresponds to the duration Ts of a symbol. FIG. 9 shows a series of such peaks, mixed with parasitic peaks resulting from interference with the two other users.

FIG. 10 shows the Dot signal of the same user, but taken after the second stage, i.e. following the cancellation of interference. The improvement is spectacular.

What is claimed is:

1. Circuit for direct sequence spread spectrum digital transmissions with the generation of interference signals corresponding to multiple access noise, comprising:

a) a first module able to receive on one input data and organize them into symbols and produce on an output a clock signal linked with said symbols, b) a second module for the differential coding of the symbols supplied by the first module, c) a third multiplexing module incorporating a first group of inputs connected to the differential coding module and a second group of inputs (E(I), E(Q)) able to receive two data items (D(I), D(Q)) defining the polarity of the interference generation signal, said multiplexing module transmitting one or other of the signals present on one or other of said input groups, d) a fourth spreading module able to multiply the signal which it receives from the multiplexing module by a pseudorandom sequence, e) a fifth amplification-inversion module having a signal input connected to the spreading module and having two control inputs (E(I), E(Q)) able to receive two signals (A(I), A(Q)) for regulating the amplification gain, the outputs of said fifth module supplying either two amplified and inverted signals ($S_I$, $S_Q$) when the fifth module is active, or the signal applied to its input when it is rendered transparent, said circuit being able to operate either as a direct sequence spread spectrum differential signal emitter when the first, second and fourth modules are rendered active, the multiplexing module then transmitting data coming from the second differential coding module, the fifth module also being rendered transparent, or as a generator of interference signals corresponding to the multiple access noise when the multiplexing module transmits the data applies to its second group of inputs and when the fourth and fifth modules are rendered active, the first and second modules being rendered inactive.

2. The circuit according to claim 1, wherein said circuit is placed in a component integrating a direct sequence spread spectrum differential signal receiver and said circuit, the receiver supplying data ($D_I$, $D_Q$) applied to the third multiplexing module of said circuit, as well as signals ($A_I$, $A_Q$) for controlling the amplification gain performed by the fifth module.

* * * * *